United States Patent [19]
Abels et al.

[11] Patent Number: 5,894,905
[45] Date of Patent: Apr. 20, 1999

[54] DRIVER RESTRAINT DEVICE FOR AN INDUSTRIAL TRUCK

[75] Inventors: Theodor Abels, Aschaffenburg; Hermann Meiller, Wernberg; Josef Kohl, Hirschau, all of Germany

[73] Assignee: Linde Aktiengesellschaft, Germany

[21] Appl. No.: 08/838,748

[22] Filed: Apr. 9, 1997

[30] Foreign Application Priority Data

Apr. 19, 1996 [DE] Germany ............ 196 15 591

[51] Int. Cl.⁶ ........................................ B60R 21/00
[52] U.S. Cl. ................................ 180/268; 180/282
[58] Field of Search ................... 180/268, 269, 180/271, 282

[56] References Cited

U.S. PATENT DOCUMENTS

| | | |
|---|---|---|
| 4,388,980 | 6/1983 | Vig et al. ............ 180/271 |
| 4,391,344 | 7/1983 | Weber et al. ............ 180/271 |
| 4,397,371 | 8/1983 | Lynnes et al. ............ 180/271 |
| 4,579,191 | 4/1986 | Klee et al. ............ 180/268 |
| 5,050,700 | 9/1991 | Kim ............ 180/268 |
| 5,383,532 | 1/1995 | Shonai et al. ............ 180/269 |

*Primary Examiner*—Kenneth R. Rice
*Attorney, Agent, or Firm*—Webb Ziesenheim Bruening Logsdon Orkin & Hanson, P.C.

[57] ABSTRACT

A driver restraint device for an industrial truck with a driver's seat has at least one restraining guard, for which an inoperative position and a restraining position are provided. During operation of the industrial truck, the restraining guard is in the restraining position, whereby it can be moved toward an inoperative position against a bias force. The restraining guard can be locked in position by a tripping device which detects a tipping of the industrial truck.

20 Claims, 1 Drawing Sheet

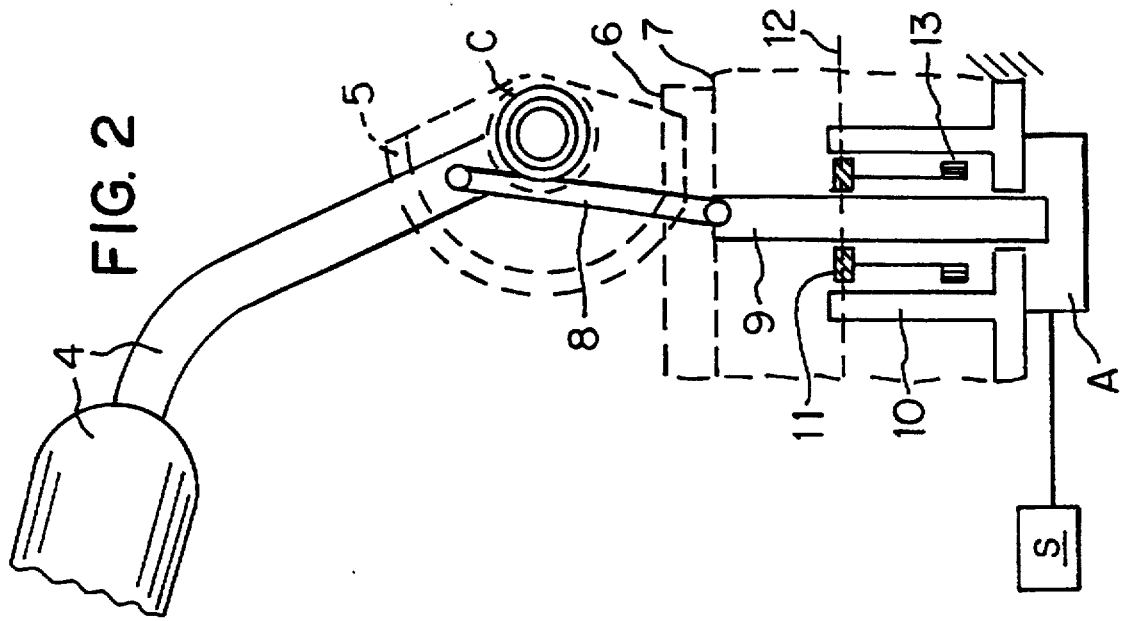
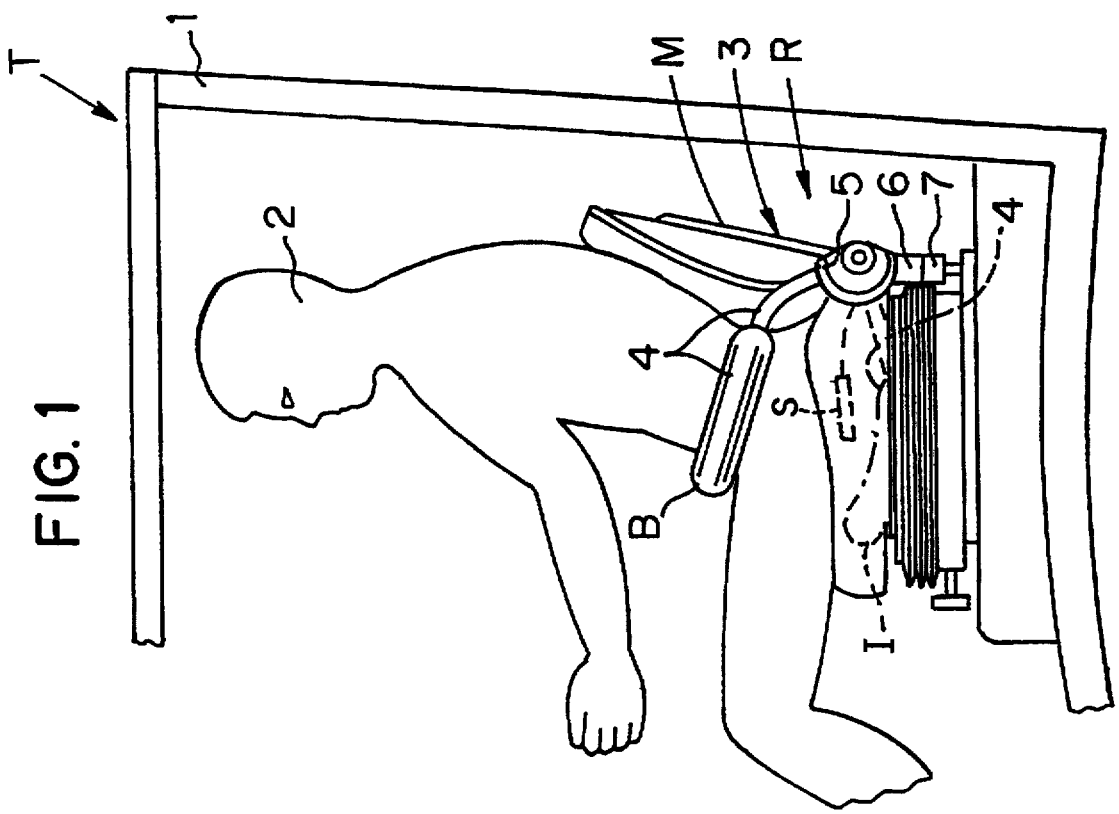

DRIVER RESTRAINT DEVICE FOR AN INDUSTRIAL TRUCK

BACKGROUND OF THE INVENTION

1. Field of the Invention

This invention relates to an industrial truck and more specifically to a driver restraint device usable with an industrial truck.

2. Description of the Prior Art

A problem encountered on industrial trucks which have at least a partly open driver cab is that when the industrial truck tips over sideways, the driver can fall out of the cab and become sandwiched between parts of the falling industrial truck and the floor or road. Factors that can lead to tipping of the industrial truck include traveling around curves at excessive speeds, failing to lower the load when driving, or driving into or over obstacles.

Driver restraint devices are utilized to secure the driver in the driver's seat in the event of an accident. Typical driver restraint devices have one or two movable restraining guards. To avoid interfering with the driver's ingress or egress, these restraining guards are preferably located outside the range of movement of the driver of the industrial truck. In use, the restraining guards are moved into a restraining position by the driver manually when he sits in the driver's seat. Such driver restraint devices are only effective, however, if the restraining guard is in the restraining position before an accident.

Alternatively the restraining guard is automatically moved into the restraining position and locked therein when a switch located to detect the presence of a driver in the driver's seat is actuated. With this type of driver restraint device, however, the driver's freedom of movement is severely restricted by the properly positioned restraining guard, even during normal operation of the industrial truck.

It is, therefore, an object of the present invention to provide a driver restraint device which is effective at all times, and which does not interfere with the driver's movements during normal operation of the industrial truck.

SUMMARY OF THE INVENTION

Accordingly, we have invented a restraining guard that can be moved into a restraining position during operation of the industrial truck. In the restraining position the restraining guard encloses the pelvis of the driver. To avoid restricting the driver's freedom of movement, the restraining guard is movable away from the driver and, hence, to an inoperative position, against a bias force. The driver is, therefore, able to move as required to control the industrial truck, e.g., when traveling in reverse. The bias force can be generated by a spring.

A tripping device locks the restraining guard in position in response to detecting tipping of the industrial truck, thereby preventing the restraining guard from moving. The tripping device includes a tipping sensor which detects tipping of the industrial truck. If the restraining guard is displaced against the bias force when the industrial truck tips over, the tripping device locks the restraining guard in this position. When the restraining guard is locked in position, it may be moved against an increased bias force back into the restraining position wherein it is locked in position. However, it is not movable into an inoperative position. Hence, it is possible to ensure that the restraining guard is locked in its restraining position and not in the inoperative position.

A pivoting device is utilized to move the restraining guard from the inoperative position into the restraining position, preferably when a load representing the weight of the driver is applied to the driver's seat. The pivoting device may include one or more actuators, such as an electric motor or a hydraulic cylinder, to move the restraining guard from its inoperative position into its restraining position.

An electrical or mechanical sensor, preferably located in the driver's seat or in the backrest of the driver's seat, is utilized to detect the occupation of the driver's seat. In response to a driver occupying the driver's seat, the sensor signals the pivoting device. In response to the signal from the sensor, the pivoting device moves the restraining device to the restraining position. The sensor is also connected to the pivoting device for detecting the position of the restraining device at the inoperative position and the restraining position. Preferably, the sensor is a continuous or multistage switch that detects force in a plurality of discrete stages. By detecting occupation of the driver's seat and the position of the restraining device, the sensor can be utilized to avoid unintentional pivoting of the restraining guard when a load is alternately applied to and removed from the driver's seat, for example, when the vehicle is driven over obstacles.

In another embodiment, the driver's seat has an elastic fastening element connected to the pivoting device. Vertical movement of the driver's seat is coupled to the pivoting movement of the restraining guard by the elastic fastening element and the pivoting device so that the restraining guard is movable into its restraining position when the weight of the driver is applied to the driver's seat.

In another embodiment, a movable element coupled to the backrest of the driver's seat is connected to the pivoting device. The movable element co-acts with the pivoting device to cause the restraining guard to be moved into the restraining position by horizontal movement of the backrest, e.g., a movement caused by the driver leaning against the backrest.

Preferably, the tipping sensor includes a pendulum to detect tipping of the industrial truck. The pendulum preferably pivots around a longitudinal axis of the vehicle and is displaced when the industrial truck tips over, or when there are sudden and severe changes in the direction of travel of the industrial truck. Displacement of the pendulum in response to tipping of the industrial truck or the industrial truck undergoing excessive lateral forces locks the restraining guard in position thereby securing the driver in the driver's seat.

The pendulum is connected to the restraining guard so that when the pendulum is displaced, a connecting part connected between the pendulum and the restraining guard is fixed in its position by the pendulum. The change in the angle of the pendulum relative to the connecting part creates a frictional connection, so that the connecting part is held secure by the pendulum.

In another embodiment, the tipping sensor is a switch, such as a mercury switch, which generates an electrical signal when it detects tipping of the industrial truck. The electrical signal from the tipping sensor is utilized by the tripping device to lock the restraining guard in position. The tripping device may include an electromagnet for locking the restraining guard in position.

BRIEF DESCRIPTION OF THE DRAWINGS

Additional advantages and details of the invention are explained in greater detail below with reference to the accompanying drawings.

FIG. 1 is an illustration of a driver restraint device in accordance with the present invention; and FIG. 2 is an illustration of a tripping device of the driver restraint device of FIG. 1.

DETAILED DESCRIPTION OF THE PREFERRED EMBODIMENTS

With reference to FIG. 1, an industrial truck T has a cab 1 for receiving a driver 2 on a spring-mounted seat 3. Located adjacent the seat 3 is a driver restraint device R which includes a restraining guard 4 which, in a restraining position B, surrounds the pelvis area of the driver 2. In FIG. 1, the restraining guard 4 in the restraining position B is shown in solid lines and the restraining guard 4 in an inoperative position I is shown in phantom.

With reference to FIG. 2, and with continuing reference to FIG. 1, a pivoting device 6 and a connecting link 5 enable the restraining guard 4 to move between the inoperative position I and the restraining position B. The pivoting device 6 co-acts with the connecting link 5 to move the restraining guard 4 outwardly and inwardly as the restraining guard 4 is moved from the inoperative position I to the restraining position B. In the restraining position B, the restraining guard encloses the driver, and more specifically, the pelvis of the driver.

The restraining guard 4 is connected elastically to a connecting part 8 which is connected elastically on its other end with a sliding piece 9 of a tripping device 7. Moving the restraining guard 4 from the restraining position B in FIG. 2 to its inoperative position I causes the connecting part 8 to push the sliding piece 9 downward.

An actuator A is utilized to move the restraining guard 4 from its inoperative position I to its restraining position B. The actuator A is connected to a sensor S which is positioned to detect when a load representing the weight of the driver 2 is applied to the driver's seat 3. When activated the sensor S causes the actuator A to actuate, thereby causing the restraining guard 4 to move to its restraining position B. The actuator A may be an electric actuator or a hydraulic actuator.

In another embodiment, a backrest of the driver's seat includes a movable or pivotable element M connected to the connecting link 5 and/or the pivoting device 6. The movable element M co-acts with the connecting link 5 and/or the pivoting device 6 to cause the restraining guard 4 to be moved into the restraining position by horizontal movement of the backrest, preferably by the driver 2 leaning against the backrest.

The sliding piece 9 is guided in a vertical direction by a guide piece 10, which is secured to the industrial truck T, and a guide ring 11. The guide ring 11 is mounted for rotation around a longitudinal axis 12 of the industrial truck T. Fastened to the guide ring 11 is a pendulum 13 which can be displaced laterally, preferably perpendicular, to the longitudinal axis 12 of the industrial truck T.

In use, when the industrial truck T tips over, or when it is driven around a tight curve at high speeds, the pendulum 13 displaces at a right angle to the longitudinal axis 12 of the industrial truck T. Displacement of the pendulum 13 causes the guide ring 11 to rotate around the longitudinal axis 12 of the industrial truck T, thereby causing inner edges of the guide ring 11 to frictionally contact the sliding piece 9. The frictional interaction between the guide ring 11 and the sliding piece 9 prevents vertical movement of the sliding piece 9 (also called a "stirrup" effect) and consequently connecting piece 8. Hence, the restraining guard 4 is locked in position.

Alternatively, the pendulum 13 and the guide ring 11 may be an electronic tipping sensor and an electromagnet, respectively. When tipping of the industrial truck is detected, the electronic tipping sensor causes the electromagnet to be energized thereby securing the sliding piece 9, and consequently, restraining guard 4 in position.

To enable the driver 2 to move in the seat 3 as required to operate the industrial truck, a bias force is applied to restraining guard 4. The bias force is preferably of sufficient extent to urge the restraining guard 4 against the driver 2 while enabling the driver 2 to move the restraining guard 4 away from his body towards the inoperative position I. The bias force may be applied by a spring c positioned in the connecting link 5.

As can be seen from the foregoing, the present invention provides a driver restraint device which is effective at all times, and which simultaneously does not interfere with the driver's movements.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

We claim:

1. A driver restraint device for an industrial truck having a seat for a driver, the restraint device comprising:
    a restraining guard positionable in a restraining position to restrain a driver in the seat during operation of the industrial truck; and
    a tripping device, wherein:
        the restraining guard is movable toward an inoperative position against a bias force; and
        the tripping device locks in place the restraining guard in response to detecting forces lateral to a longitudinal axis of the industrial truck.

2. The driver restraint device as claimed in claim 1, further including a pivoting device which causes the restraining guard to move outwardly and inwardly as the restraining guard moves from the inoperative position to the restraining position.

3. The driver restraint device as claimed in claim 2, further including an actuator for causing the pivoting device to move the restraining guard from the inoperative position to the restraining position.

4. The driver restraint device as claimed in claim 3, further including a sensor positioned to detect occupation of the seat, the sensor causing the actuator to actuate thereby causing the restraining device to move to the restraining position in response to the sensor detecting occupation of the seat.

5. The driver restraint device as claimed in claim 4, wherein the sensor is connected to the pivoting device for detecting the position of the restraining device at the inoperative position and the restraining position.

6. The driver restraint device as claimed in claim 5, wherein the sensor is a continuous or multi-stage switch.

7. The driver restraint device as claimed in claim 5, wherein the sensor detects force in a plurality of discrete stages, and wherein the sensor avoids unintentional pivoting of the restraining guard when a load is alternately applied to and removed from the seat.

8. The driver restraint device as claimed in claim 2, further including a connecting part elastically connected between the restraining guard and the pivoting device.

9. The driver restraint device as claimed in claim 2, wherein a backrest of the seat has a movable element connected to the pivoting device, wherein the movable element co-acts with the pivoting device to cause the restraining device to be moved into the restraining position in response to horizontal movement of the backrest.

10. The driver restraint device as claimed in claim 1, wherein the tripping device detects tipping of the industrial truck.

11. The driver restraint device as claimed in claim 10, wherein the tripping device includes one of (i) a tipping sensor which generates an electrical signal in response to detecting tipping of the industrial truck and (ii) a pendulum which displaces in response to detecting tipping of the industrial truck.

12. The driver restraint device as claimed in claim 11, wherein a connecting part connected between the restraining guard and the pendulum is fixed in position in response to the pendulum undergoing displacement.

13. The driver restraint device as claimed in claim 3, wherein the actuator is one of an electric actuator and a hydraulic actuator.

14. The driver restraint device as claimed in claim 4, wherein the sensor is one of an electrical sensor and a mechanical sensor.

15. A driver restraint device for an industrial truck, the restraint device comprising:

a restraining guard movable between an inoperative position and a restraining position adjacent a seat of the industrial truck;

means for biasing the restraining guard to the restraining position; and means for locking the restraining guard in position in response to tipping of the industrial truck, wherein the restraining guard is movable towards the inoperative position against the bias force in the absence of the restraining guard being locked in position.

16. The driver restraint device as claimed in claim 15, further including means for moving the restraining guard to the restraining position in response to a load being applied to the seat.

17. The driver restraint device as claimed in claim 15, further including means for pivoting the restraining guard outwardly and inwardly as the restraining guard is moved from the inoperative position to the restraining position.

18. The driver restraint device as claimed in claim 16, wherein the means for moving includes:

a sensor positioned to detect occupation of the seat; and an actuator connected to receive an output of the sensor, wherein the actuator actuates thereby causing the restraining guard to move to the restraining position in response to the sensor detecting occupation of the seat.

19. The driver restraint device as claimed in claim 17, further including a movable element positioned in a backrest of the seat, the movable element co-acting with the means for pivoting to move the restraining guard to the restraining position in response to horizontal movement of the backrest.

20. The driver restraint device as claimed in claim 15, wherein the means for locking includes one of (i) a tipping sensor which generates an electrical signal in response to detecting tipping of the industrial truck and (ii) a pendulum which displaces in response to detecting tipping of the industrial truck.

* * * * *